E. HAIMAN.

SWEEPS FOR CULTIVATORS AND PLOWS.

No. 6,887. Reissued Feb. 1, 1876.

WITNESSES:

A. W. Almquist

Alex F. Roberts

INVENTOR:

Elias Haiman

BY

ATTORNEYS.

UNITED STATES PATENT OFFICE.

ELIAS HAIMAN, OF COLUMBUS, GEORGIA.

IMPROVEMENT IN SWEEPS FOR CULTIVATORS AND PLOWS.

Specification forming part of Letters Patent No. 147,633, dated February 17, 1874; reissue No. 6,887, dated February 1, 1876; application filed December 18, 1875.

*To all whom it may concern:*

Figure 1:
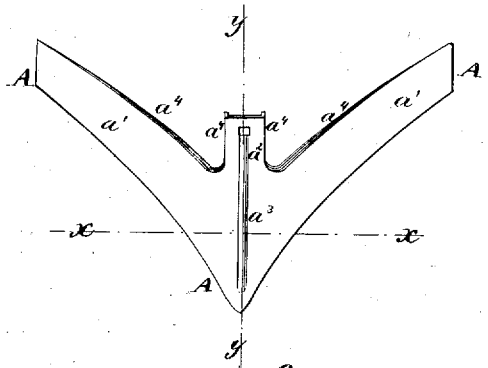
Figure 2:
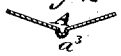
Figure 3:
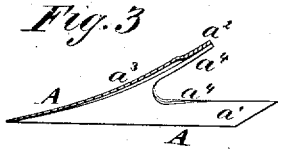
Figure 4:
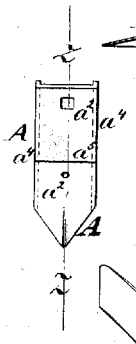
Figure 5:
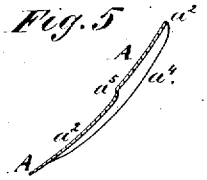
Figure 6:
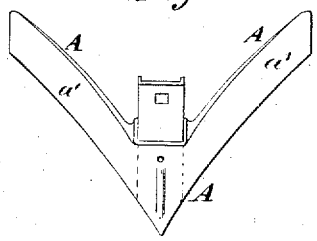

Be it known that I, ELIAS HAIMAN, of Columbus, in the county of Muscogee and State of Georgia, have invented a new and useful Improvement in Sweeps for Cultivators and Plows, of which the following is a specification:

Figure 1 is a front view of my improved sweep. Fig. 2 is a cross-section of the same, taken through the line *x x*, Fig. 1. Fig. 3 is a vertical section of the same, taken through the line *y y*, Fig. 1. Fig. 4 represents the stem made separate. Fig. 5 is a vertical section of the detached stem, taken through the line *z z*, Fig. 4. Fig. 6 is a front view of a sweep with separate stem.

Similar letters of reference indicate corresponding parts.

My invention has for its object to construct sweeps and their stems so as to enable them to be made lighter and cheaper than when made in the usual way, and, at the same time, give them the necessary stiffness and strength.

The invention will first be fully described, and then pointed out in the claims.

A represents the sweep, of which $a^1$ are the wings; $a^2$ is the stem. The middle part of the sweep A has a ridge or bead, $a^3$, formed along its central line, and extending from the bolt-hole in the stem to, or nearly to, the point. The side edges of the stem $a^2$ and part of the upper edges of the wings $a^1$ are bent to form flanges $a^4$. The flanges $a^4$ strengthen and stiffen the stem and wings in such a manner as to give the sweeps the required strength, and prevent them from being bent. In the same way the ridge or bead $a^3$ strengthens or adds to the strength of the sweep; also divides the soil and prevents it from lodging on the sweep, thereby causing it to run with light draft.

This construction allows me to make lighter and thinner, and thus cheaper, sweeps, and, at the same time, give them the necessary stiffness and strength.

Having thus described my invention, I claim as new in sweeps for cultivators and plows, and desire to secure by Letters Patent—

1. The ridge or bead $a^3$, formed upon the middle part of the sweep, between the bolt-hole and the point, substantially as herein shown and described.

2. The flanges $a^4$, formed upon the upper edge of the wings $a^1$, substantially as herein shown and described.

3. As a new article of manufacture, a sweep, A, having the bead $a^3$ and the flanges $a^4$, arranged as described.

ELIAS HAIMAN.

Witnesses:

GEO. O. BERRY,

CLIFF B. GRIMES.